US009525667B2

(12) United States Patent
Wang

(10) Patent No.: US 9,525,667 B2
(45) Date of Patent: Dec. 20, 2016

(54) METHOD AND SYSTEM FOR ROAMING WEBSITE ACCOUNT AND PASSWORD

(71) Applicant: TENCENT TECHNOLOGY (SHENZHEN) COMPANY LIMITED, Shenzhen (CN)

(72) Inventor: Wanxin Wang, Shenzhen (CN)

(73) Assignee: TENCENT TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 14/266,081

(22) Filed: Apr. 30, 2014

(65) Prior Publication Data

US 2014/0365778 A1 Dec. 11, 2014

Related U.S. Application Data

(63) Continuation of application No. PCT/CN2013/089882, filed on Dec. 18, 2013.

(30) Foreign Application Priority Data

Jun. 7, 2013 (CN) .......................... 2013 1 0226337

(51) Int. Cl.
*H04L 29/06* (2006.01)
*G06F 21/00* (2013.01)

(52) U.S. Cl.
CPC ........... *H04L 63/0428* (2013.01); *G06F 21/00* (2013.01); *H04L 63/0823* (2013.01)

(58) Field of Classification Search
USPC ...................................................... 726/5, 18
See application file for complete search history.

(56) References Cited

U.S. PATENT DOCUMENTS

| 6,240,184 B1* | 5/2001 | Huynh et al. ................. 380/206 |
| 8,667,281 B1* | 3/2014 | Chenna ................. H04L 9/0825 713/168 |
| 8,954,004 B1* | 2/2015 | Wang et al. ................. 455/41.1 |
| 2006/0050688 A1* | 3/2006 | Panagopoulos ......... H04L 12/66 370/356 |
| 2013/0198824 A1* | 8/2013 | Hitchcock ............... G06F 21/00 726/6 |
| 2014/0068727 A1* | 3/2014 | Shamis et al. ..................... 726/5 |
| 2014/0223175 A1* | 8/2014 | Bhatnagar ................ G09C 5/00 713/159 |
| 2015/0040067 A1* | 2/2015 | Ma ............................... 715/810 |

* cited by examiner

*Primary Examiner* — Joseph P Hirl
*Assistant Examiner* — Chi Nguy
(74) *Attorney, Agent, or Firm* — Staas & Halsey LLP

(57) ABSTRACT

A method and system for roaming website accounts and passwords are provided. The method is operational on a first client and includes: authenticating website accounts and passwords that have been stored; obtaining the stored website addresses, accounts and passwords according to a success verification; encrypting the stored website addresses, accounts and passwords for generating encrypted information, and generating a first QR code to be obtained by a second client according to the encrypted information. The website accounts and passwords are roamed and synchronized to be shared. The synchronization process verifies the accounts and passwords, and would not need a third-party server. Risk of data lost in case that the third-party server is attacked would be eliminated, and the safety for the accounts and passwords is improved.

7 Claims, 8 Drawing Sheets

METHOD AND SYSTEM FOR ROAMING WEBSITE ACCOUNT AND PASSWORD

CROSS-REFERENCE TO RELATED APPLICATIONS

The present application is a continuation application of International Application PCT/CN2013/089882, and claims foreign priority to Chinese application 201310226337.X filed Jun. 7, 2013, and which is incorporated herein by reference in their entireties.

FIELD OF THE INVENTION

The present disclosure relates generally to the field of data security, and particularly, to a method and system for roaming website accounts and passwords.

BACKGROUND OF THE INVENTION

Most of the current browsers provide functions of remembering third-party website accounts and passwords. Typically, the browsers store the website accounts and passwords in a local file system. When the browser is uninstalled, or the user is using the browser on another terminal, the website accounts and passwords need to be re-inputted.

Some of the browsers provide synchronize functions for the website accounts and passwords. After the user registers a browser account, information such as the bookmarks and configurations are synchronized to a server and stored corresponding to the browser account. Accordingly, the locally stored third-party website accounts and passwords are synchronized to the server. As the user uninstalls the browser on a terminal and uses the browser on another terminal, it is only needed to login the browser account for retrieving the stored data through synchronization, with auto fill functions being provided when logging into the third-party website. This is unsafe in that:

1. When the browser account is logged into through another terminal wherein the logging terminal is unreliable, in case that the browser account is not logged out after using the browser, it is likely that the third-party website accounts and passwords would be maliciously used to login the third-party websites;

2. If the browser server is flawed, the stored website accounts and passwords would be positioned in high risk in case that the browser server is hacked.

SUMMARY OF THE INVENTION

Accordingly, it is necessary to provide a method for roaming website account and password which has a high security level.

Accordingly, it is also necessary to provide a system for roaming website account and password which has a high security level.

A method for roaming website account and password operational on a first client, the method includes:
verifying stored website accounts and passwords;
obtaining the stored website addresses, accounts and passwords according to a success verification;
encrypting the stored website addresses, accounts and passwords to generate first encrypted information, and converting the first encrypted information into a first QR code to be obtained by a second client.

A method for roaming website account and password, wherein the method is operational on a first client, the method includes:
obtaining website address, and applying to a transit server for assigning a session identifier; encrypting the website address and the assigned session identifier to generate fourth encrypted information, converting the fourth encrypted information into a fourth QR code;
receiving the encrypted website address, account and password from the transit server, and decrypting to obtain the website account and password;
wherein the encrypted website address, account and password are generated through encrypting the website address, account and password on a second client if the encrypted information received by the second client is decrypted to obtain the website address and corresponding website account and password are stored on the second client.

A method for roaming website account and password, wherein the method is operational on a second client, the method includes:
obtaining a first QR code generated by a first client after encrypting stored website address, account and password;
decoding the first QR code to obtain the website address, account and password, and storing the website address, account and password.

A method for roaming website account and password, wherein the method is operational on a second client, the method includes:
obtaining a fourth QR code generated by a first client after encrypting a website address and an assigned session identifier from a transit server;
decoding the fourth QR code to obtain the website address; determining whether account and password corresponding to the website address are stored on the second client; and encrypting the website address, account and password if stored; and sending the session identifier and the encrypted website address, account and password to the transit server.

A system for roaming website account and password, wherein the system includes a first client, the first client includes:
a verification module for verifying stored website accounts and passwords;
an obtaining module for obtaining the stored website addresses, accounts and passwords after the verification succeeds;
a generation module for encrypting the stored website addresses, accounts and passwords for generating first encrypted information, and converting the first encrypted information into a first QR code to be obtained by a second client.

A system for roaming website account and password, wherein the system includes a first client, the first client includes:
a generation module for obtaining website address, and applying to a transit server for assigning a session identifier; encrypting the website address and the assigned session identifier to generate fourth encrypted information, converting the fourth encrypted information into a fourth QR code;
a receiving module for receiving the encrypted website address, account and password from the transit server;
a decryption module for decrypting to obtain the website account and password;
a notification module for notifying the transit server to delete the encrypted website address, account and password after the first client has obtained the website account and password;

wherein the encrypted website address, account and password are generated through encrypting the website address, account and password on a second client if the encrypted information received by the second client is decrypted to obtain the website address and corresponding website account and password are stored on the second client.

A system for roaming website account and password, wherein the system includes a second client, the second client includes:

an obtaining module for obtaining a first QR code generated by a first client after encrypting stored website address, account and password;

a decoding module for decoding the first QR code to obtain the website address, account and password, and storing the website address, account and password.

A system for roaming website account and password, wherein the system includes a second client, the second client includes:

an obtaining module for obtaining a fourth QR code generated by a first client after encrypting a website address and an assigned session identifier from a transit server;

a decoding module for decoding the fourth QR code to obtain the website address;

a determining module for determining whether account and password corresponding to the website address are stored on the second client;

a generation module for encrypting the website address, account and password;

a transmitting module for sending the session identifier and the encrypted website address, account and password to the transit server.

According to the described method and system for roaming website account and password, the first client verifies the stored website accounts and passwords, and encrypts the website accounts and passwords after the verification is passed, to generate the first QR code. The first QR code is obtained by the second client and decoded to obtain the website accounts and passwords. Thereby the website accounts and passwords are roamed and synchronized to be shared. The synchronization process verifies the accounts and passwords, and would not need a third-party server. Risk of data lost in case that the third-party server is attacked would be eliminated, and the safety for the accounts and passwords is improved.

DESCRIPTION OF THE PREFERRED EMBODIMENTS

The following embodiments and accompanying drawings would be described in detail for explaining the method and apparatus for updating applications in accordance with the present disclosure.

Figure 1:
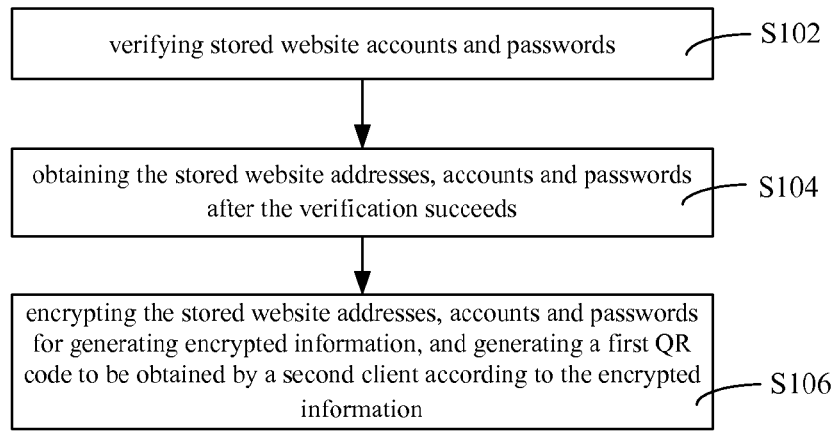
FIG. 1 is a flow diagram of a method for roaming website account and password according to an exemplary embodiment.

A first client and a second client are located within a short distance. The first client encrypts website accounts and passwords that have been stored, to generate two-dimensional information (QR information). The QR information is obtained by the second client, and has the information decoded to obtain the website accounts and passwords. Referring to FIG. 1, a flow diagram for roaming website account and password according to an embodiment is illustrated. The method for roaming website account and password is operational on the first client, which includes:

Step S102, verifying website accounts and passwords that have been stored.

Specifically, the users have stored website accounts and corresponding passwords in the browser on the first client. When the user intends to synchronize the stored website accounts and passwords from the first client to the second client, the user need to login the websites once again. The website accounts are auto filled, and the user inputted passwords are received to be compared with the stored corresponding passwords to determine if the inputted passwords are consistent with the stored ones. If the passwords are consistent, it is indicative that the transmit process is reliable; otherwise it is determined as unreliable and the synchronization shall be suspended.

Figure 2:
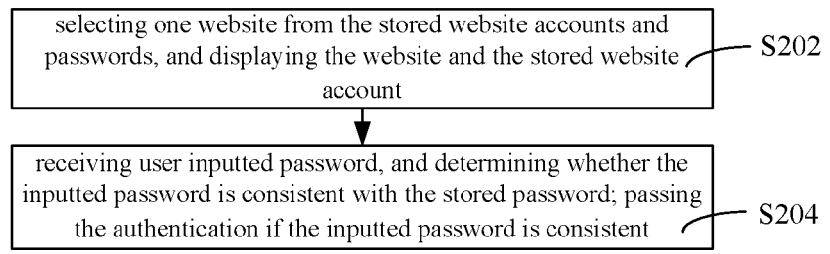
FIG. 2 is a flow diagram of a process for verifying website accounts and passwords that have been stored according to an exemplary embodiment.

According to an embodiment, when the stored website accounts and passwords are synchronized from the first client to the second client, it could only be needed to verify one of the website accounts and passwords. If the verification of the one website account and password is passed, it is determined that the transmit process is reliable; otherwise a verification failure would be indicative of an unreliable transmit process. Referring to FIG. 2, step S102 includes:

Step S202, selecting one website from the stored website accounts and passwords, and displaying the website and the stored website account.

Specifically, the selected website could be randomly chosen, or the website with the most frequent visiting. After the website is selected, the website name and stored account is displayed on a UI (User Interface) of the browser on the first client, and an area is provided for receiving user inputted password.

Step S204, receiving user inputted password, and determining whether the inputted password is consistent with the stored password; passing the verification if the inputted password is consistent.

Specifically, the password is received through user's operation on input devices such as mouse, keyboard, or touch screen, etc.

Verifying one of the website accounts and passwords would determine that it is the user himself who intends to synchronize the website accounts and passwords from the first client to the second client; thereby not all the website accounts and passwords are needed to be verified; and verification time could be saved.

Step S104, obtaining the stored website addresses, accounts and passwords according to a success verification.

Specifically, if the verification is passed, the stored website address, accounts and passwords are obtained. Preferably, the website address, account and password for one website would be classified as an item and be assigned with a number, whereas all the records would collectively shape a table.

Step S106, encrypting the stored website addresses, accounts and passwords for generating encrypted information, and generating a first QR code to be obtained by a second client according to the encrypted information.

Specifically, the encrypted information could be generated through adding specific characters into the stored website addresses, accounts and passwords. The specific characters would be characters mutually agreed by the first client and the second client, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

The second client could scan the first QR code that is displayed on the first client, and use a QR decoding application to decode the first QR code for obtaining the website accounts and passwords. The second client could also receive the first QR code from the first client through Bluetooth or Wi-Fi or wire transmission, and use the QR decoding application to decode the first QR code for obtaining the website accounts and passwords.

According to the described method for roaming website account and password, the first client verifies the stored website accounts and passwords, and encrypts the website accounts and passwords after the verification is passed, to generate the first QR code. The first QR code is obtained by the second client and decoded to obtain the website accounts and passwords. Thereby the website accounts and passwords are roamed and synchronized to be shared. The synchronization process verifies the accounts and passwords, and would not need a third-party server. Risk of data lost in case that the third-party server is attacked would be eliminated, and the safety for the accounts and passwords is improved.

Furthermore, the method for roaming website account and password further includes: the second client obtaining the first QR code, and decoding the first QR code to obtain the website addresses, accounts and passwords, and storing the website addresses, accounts and passwords.

Specifically, the second client could scan the first QR code that is displayed on the first client, and use a QR decoding application to decode the first QR code for obtaining the website accounts and passwords. The second client could also receive the first QR code from the first client through Bluetooth or Wi-Fi or wire transmission, and use the QR decoding application to decode the first QR code for obtaining the website accounts and passwords.

Figure 3:
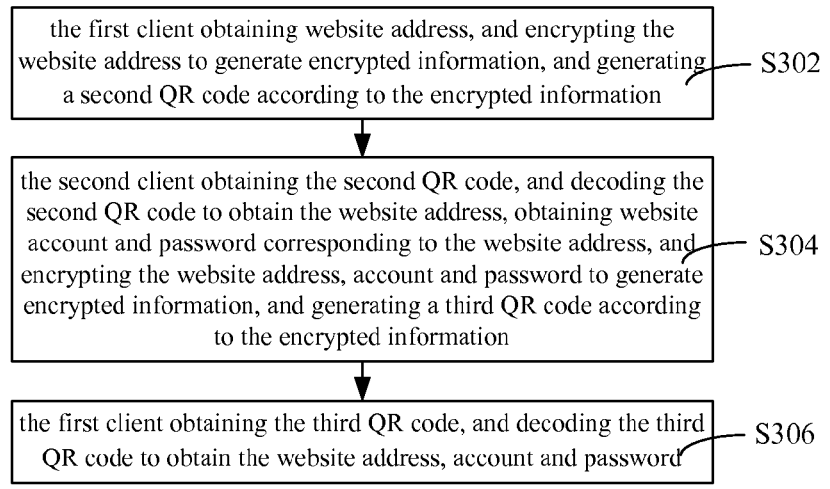
FIG. 3 is a flow diagram of a method for roaming website account and password from a second client to a first client according to an exemplary embodiment.

Further, according to an embodiment, in case that the first client accesses a website wherein the first client does not have the corresponding website account and password stored thereon while the second client has, the first client would accordingly generate a second QR code. The second client decodes the second QR code to obtain the website, and accordingly find the corresponding account and password to generate a third QR code to be received by the first client for subsequently decoding and obtaining the account and password. Referring to FIG. 3, the method for roaming website account and password includes further steps that the second client roams account and password to the first client, which includes in detail:

Step S302, the first client obtaining website address, and encrypting the website address to generate encrypted information, and generating a second QR code according to the encrypted information.

Specifically, the first client obtains website address that the user intends to visit, and add specific characters for encryption. The specific characters would be characters mutually agreed by the first client and the second client, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

Step S304, the second client obtaining the second QR code, and decoding the second QR code to obtain the website address, obtaining website account and password corresponding to the website address, and encrypting the website address, account and password to generate encrypted information, and generating a third QR code according to the encrypted information.

Step S306, the first client obtaining the third QR code, and decoding the third QR code to obtain the website address, account and password.

In the present embodiment, the first client and the second client both have QR code scanning functions.

Besides, if both the first and the second clients have QR code scanning functions, when the second client roams the website accounts and passwords to the first client, the first client would also be able to roam the website account and passwords to the second client in the same way.

According to the above described method for roaming website account and password, the first client and second client would conduct the bi-directional roaming of the website account and password. The website accounts and passwords could be ensured to be roamed from one client to another as soon as either of the clients has the accounts and passwords stored thereon, and the synchronization process has a high security level.

Figure 4:
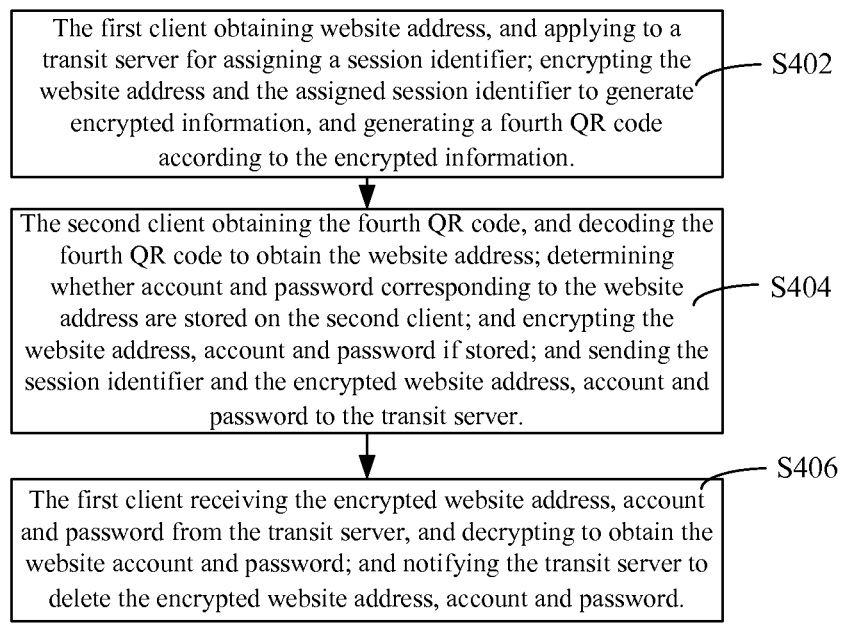
FIG. 4 is a flow diagram of a method for roaming website account and password from a second client to a first client according to an exemplary embodiment.

Furthermore, according to another embodiment, in case that the first client accesses a website wherein the first client does not have the corresponding website account and password stored thereon while the second client has, the first client would generate a fourth QR code according to the website and a session identifier assigned by a transit server. The second client decodes the fourth QR code to obtain the website, and accordingly find the corresponding account and password to be sent to the first client through the transit server. Referring to FIG. 4, the method for roaming account and password includes further steps that the second client roams account and password to the first client, which includes in detail:

Step S402, the first client obtaining website address, and applying to a transit server for assigning a session identifier; encrypting the website address and the assigned session identifier to generate encrypted information, and generating a fourth QR code according to the encrypted information.

Specifically, the session identifier is a unique identifier that the transit server assigns to the first client. The transit server could find the corresponding first client according to the transit server. During encryption, specific characters are added. The specific characters would be characters mutually agreed by the first client and the second client, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

Step S404, the second client obtaining the fourth QR code, and decoding the fourth QR code to obtain the website address; determining whether account and password corresponding to the website address are stored on the second client; and encrypting the website address, account and password if stored; and sending the session identifier and the encrypted website address, account and password to the transit server.

Specifically, the second client receives the fourth QR code through scanning the fourth QR code displayed on the first client, or through wireless or wire transmission from the first client. The second client finds in its local storage for determining whether corresponding account and password are stored thereon. If there is stored the account and password corresponding to the website address, the second client encrypts the website address, account and password, and packages the session identifier and the encrypted website address, account and password before sending to the transit server.

Further, if it is determined that the second client does not have the website account and password corresponding to the website address stored thereon, the first client receives from the transit server a notification indicative that the second client does not have the website account and password.

Step S406, the first client receiving the encrypted website address, account and password from the transit server, and decrypting to obtain the website account and password; and notifying the transit server to delete the encrypted website address, account and password.

Specifically, after the first client has obtained the website address and corresponding account and password, the transit server would immediately delete the encrypted website address and account and password. The stored website address, account and password would be avoided to be unintentionally leaked. In the present embodiment, the second client has got QR code scanning function.

According to an embodiment, a method for roaming website account and password, wherein the method is operational on a first client, the method includes:

obtaining website address, and applying to a transit server for assigning a session identifier; encrypting the website address and the assigned session identifier to generate encrypted information, adding predetermined specific characters into the encrypted information to generate a fourth QR code according to the encrypted information;

receiving the encrypted website address, account and password from the transit server, and decrypting to obtain the website account and password;

wherein the encrypted website address, account and password are generated through encrypting the website address, account and password on a second client if the encrypted information received by the second client is decrypted to obtain the website address and corresponding website account and password are stored on the second client.

Figure 5:
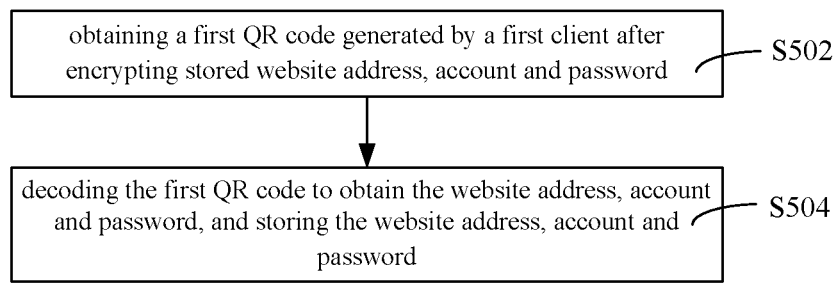
FIG. 5 is a flow diagram of a method for roaming website account and password according to another exemplary embodiment.

Referring to FIG. 5, a first client and a second client are located within a short distance. The first client encrypts website accounts and passwords that have been stored, to generate two-dimensional information (QR information). The QR information is obtained by the second client, and has the information decoded to obtain the website accounts and passwords. A method for roaming website account and password, wherein the method could be operated on a second client, the method includes:

Step S502, obtaining a first QR code generated by a first client after encrypting stored website address, account and password.

Step S504, decoding the first QR code to obtain the website address, account and password, and storing the website address, account and password.

Figure 6:
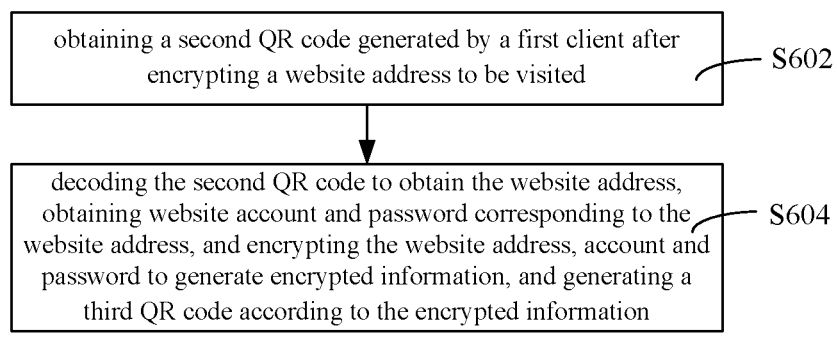
FIG. 6 is a flow diagram of a method for roaming website account and password from a second client to a first client according to another exemplary embodiment.

In case that the first client accesses a website wherein the first client does not have the corresponding website account and password stored thereon while the second client has, the first client would accordingly generate a second QR code. The second client decodes the second QR code to obtain the website, and accordingly find the corresponding account and password to generate a third QR code to be received by the first client for subsequently decoding and obtaining the account and password. Referring to FIG. 6, a method for roaming website account and password, wherein the method could be operated on a second client, the method includes:

Step S602, obtaining a second QR code generated by a first client after encrypting a website address to be visited.

Step S604, decoding the second QR code to obtain the website address, obtaining website account and password corresponding to the website address, and encrypting the website address, account and password to generate encrypted information, and generating a third QR code according to the encrypted information.

Figure 7:
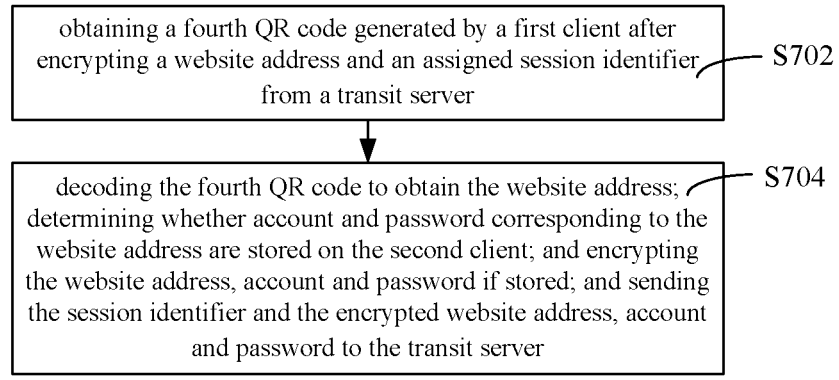
FIG. 7 is a flow diagram of a method for roaming website account and password from a second client to a first client according to another exemplary embodiment.

In case that the first client accesses a website wherein the first client does not have the corresponding website account and password stored thereon while the second client has, the first client would generate a fourth QR code according to the website and a session identifier assigned by a transit server. The second client decodes the fourth QR code to obtain the website, and accordingly find the corresponding account and password to be sent to the first client through the transit server. Referring to FIG. 7, a method for roaming website account and password, wherein the method could be operated on a second client, the method includes:

Step S702, obtaining a fourth QR code generated by a first client after encrypting a website address and an assigned session identifier from a transit server.

Step S704, decoding the fourth QR code to obtain the website address; determining whether account and password corresponding to the website address are stored on the second client; and encrypting the website address, account and password if stored; and sending the session identifier and the encrypted website address, account and password to the transit server.

Further, if it is determined that the second client does not have the website account and password corresponding to the website address stored thereon, sending to the first client through the transit server a notification indicative that the second client does not have the website account and password.

A method for roaming website account and password, wherein the method is operational on a second client, the method includes:

obtaining a fourth QR code generated by a first client after encrypting a website address and an assigned session identifier from a transit server;

decoding the fourth QR code to obtain the website address; determining whether account and password corresponding to the website address are stored on the second client; and encrypting the website address, account and password if stored; and sending the session identifier and the encrypted website address, account and password to the transit server.

Figure 8:
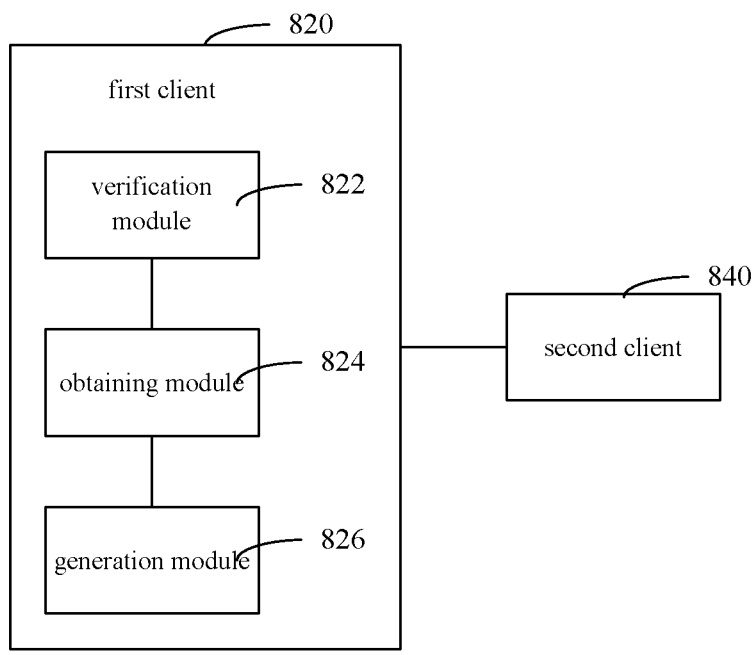
FIG. 8 is a block diagram of a system for roaming website account and password according to an exemplary embodiment.

A first client and a second client are located within a short distance. The first client encrypts website accounts and passwords that have been stored, to generate two-dimensional information (QR information). The QR information is obtained by the second client, and has the information decoded to obtain the website accounts and passwords. Referring to FIG. 8, a block diagram for a system for roaming website account and password according to an embodiment is illustrated. The system for roaming website account and password includes a first client 820 and a second client 840. The first client 820 includes a verification module 822, an obtaining module 824, and a generation module 826. Wherein, The verification module 822 is used for verifying website accounts and passwords that have been stored.

Specifically, the users have stored website accounts and corresponding passwords in the browser on the first client 820. When the user intends to synchronize the stored website accounts and passwords from the first client 820 to the second client 840, the user need to login the websites once again. The website accounts are auto filled, and the user inputted passwords are received to be compared by the verification module 822 with the stored corresponding passwords in the first client 820 to determine if the inputted passwords are consistent with the stored ones. If the passwords are consistent, it is indicative that the transmit process is reliable; otherwise it is determined as unreliable and the synchronization shall be suspended.

Figure 9:
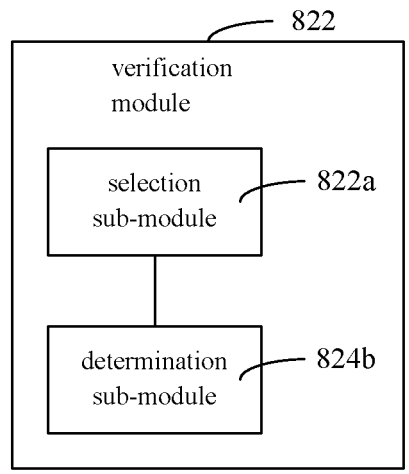
FIG. 9 is a block diagram of the verification module of FIG. 8.

According to an embodiment, when the stored website accounts and passwords are synchronized from the first client 820 to the second client 840, it could only be needed to authenticate one of the website accounts and passwords. If the verification of the one website account and password is passed, it is determined that the transmit process is reliable; otherwise a verification failure would be indicative of an unreliable transmit process. Referring to FIG. 9, the verification module 822 includes a selection sub-module 822a and a determination sub-module 822b. Wherein, The selection sub-module 822a is used for selecting one website from the stored website accounts and passwords, and displaying the website and the stored website account.

Specifically, the selected website could be randomly chosen, or the website with the most frequent visiting. After the website is selected, the website name and stored account is displayed on a UI (User Interface) of the browser on the first client 820, and an area is provided for receiving user inputted password.

The determination sub-module 822b is used for receiving user inputted password, and determining whether the inputted password is consistent with the stored password; passing the verification if the inputted password is consistent.

Specifically, the password is received through user's operation on input devices such as mouse, keyboard, or touch screen, etc.

Verifying one of the website accounts and passwords would determine that it is the user himself who intends to synchronize the website accounts and passwords from the first client 820 to the second client 840; thereby not all the website accounts and passwords are needed to be verified; and verification time could be saved.

The obtaining module 824 is used for obtaining the stored website addresses, accounts and passwords according to a success verification.

Specifically, if the verification is passed, the stored website address, accounts and passwords are obtained. Preferably, the website address, account and password for one website would be classified as an item and be assigned with a number, whereas all the records would collectively shape a table.

The generation module 826 is used for encrypting the stored website addresses, accounts and passwords for generating encrypted information, and generating a first QR code to be obtained by a second client according to the encrypted information.

Specifically, the encrypted information could be generated by the generation module 826 through adding specific characters into the stored website addresses, accounts and passwords. The specific characters would be characters mutually agreed by the first client and the second client, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

The second client 840 could scan the first QR code that is displayed on the first client 820, and use a QR decoding application to decode the first QR code for obtaining the website accounts and passwords. The second client 840 could also receive the first QR code from the first client 820 through Bluetooth or Wi-Fi or wire transmission, and use the QR decoding application to decode the first QR code for obtaining the website accounts and passwords.

The second client 840 is used for obtaining the first QR code, and decoding the first QR code to obtain the website addresses, accounts and passwords, and storing the website addresses, accounts and passwords.

Specifically, the second client 840 could scan the first QR code that is displayed on the first client 820, and use a QR decoding application to decode the first QR code for obtaining the website accounts and passwords. The second client 840 could also receive the first QR code from the first client 820 through Bluetooth or Wi-Fi or wire transmission, and use the QR decoding application to decode the first QR code for obtaining the website accounts and passwords.

According to the described system for roaming website account and password, the first client 820 verifies the stored website accounts and passwords, and encrypts the website accounts and passwords after the verification is passed, to generate the first QR code. The first QR code is obtained by the second client 840 and decoded to obtain the website accounts and passwords. Thereby the website accounts and passwords are roamed and synchronized to be shared. The synchronization process verifies the accounts and passwords, and would not need a third-party server. Risk of data lost in case that the third-party server is attacked would be eliminated, and the safety for the accounts and passwords is improved.

Figure 10:
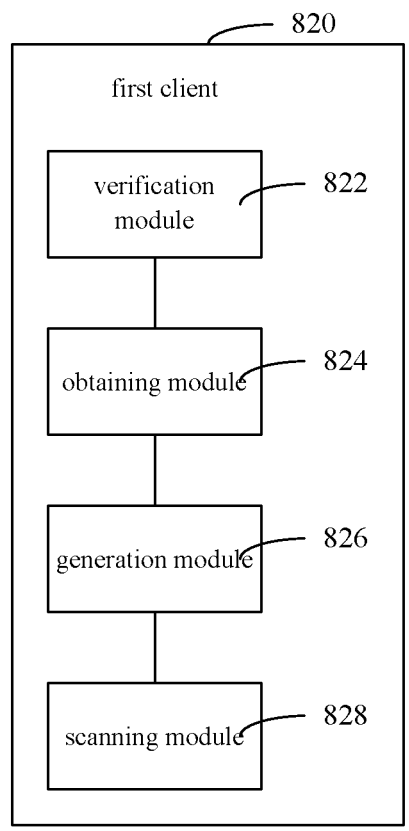
FIG. 10 is a block diagram of a first client according an exemplary embodiment.

According to an embodiment, in case that the first client 820 accesses a website wherein the first client 820 does not have the corresponding website account and password stored thereon while the second client 840 has, the first client 820 would accordingly generate a second QR code. The second client 840 decodes the second QR code to obtain the website, and accordingly find the corresponding account and password to generate a third QR code to be received by the first client 820 for subsequently decoding and obtaining the account and password. Referring to FIG. 10, the second client 840 is used for roaming website account and password to the first client 820. The first client 820 includes a scanning module 828 besides the verification module 822, the obtaining module 824 and the generation module 826. Wherein, The generation module 826 is further used for obtaining website address, and encrypting the website address to generate encrypted information, and generating a second QR code according to the encrypted information.

Specifically, the first client 820 obtains website address that the user intends to visit, and add specific characters for encryption. The specific characters would be characters mutually agreed by the first client and the second client, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

The second client is further used for obtaining the second QR code, and decoding the second QR code to obtain the website address, obtaining website account and password corresponding to the website address, and encrypting the website address, account and password to generate encrypted information, and generating a third QR code according to the encrypted information.

The scanning module 828 is used for obtaining the third QR code, and decoding the third QR code to obtain the website address, account and password.

In the present embodiment, the first client 820 and the second client 840 both have QR code scanning functions.

Besides, if both the first client 820 and the second client 840 have QR code scanning functions, when the second client 840 roams the website accounts and passwords to the first client 820, the first client 820 would also be able to roam the website account and passwords to the second client 840 in the same way. The second client 840 would thereby include the verification module, the obtaining module and the generation module.

Figure 11:
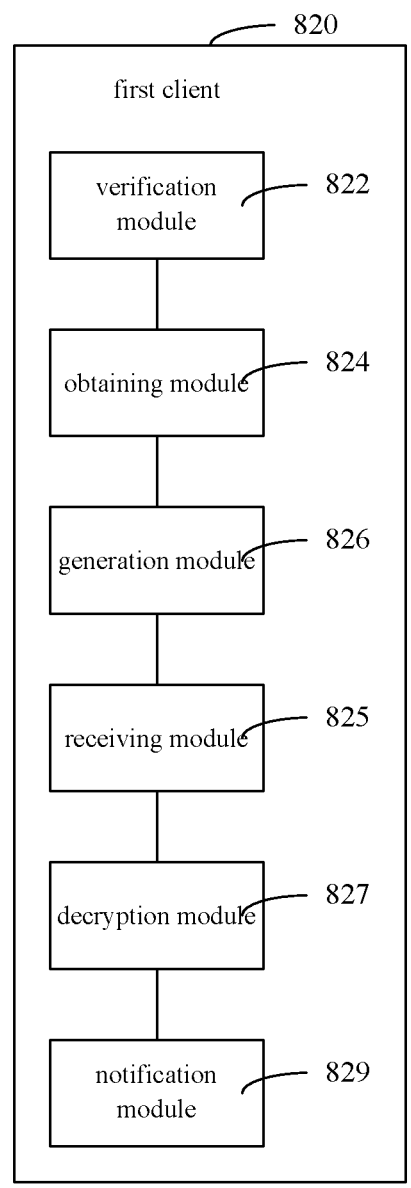
FIG. 11 is a block diagram of a first client according an exemplary embodiment.

Furthermore, according to another embodiment, in case that the first client 820 accesses a website wherein the first client 820 does not have the corresponding website account and password stored thereon while the second client 840 has, the first client 820 would generate a fourth QR code according to the website and a session identifier assigned by a transit server. The second client 840 decodes the fourth QR code to obtain the website, and accordingly find the corresponding account and password to be sent to the first client 820 through the transit server. Referring to FIG. 11, the second client 840 is used for roaming website account and password to the first client 820. The first client 820 includes a receiving module 825, a decryption module 827 and a notification module 829 besides the verification module 822, the obtaining module 824 and the generation module 826.

The generation module 826 is further used for obtaining website address, and applying to a transit server for assigning a session identifier; encrypting the website address and the assigned session identifier to generate encrypted information, and generating a fourth QR code according to the encrypted information.

Specifically, the session identifier is a unique identifier that the transit server assigns to the first client 820. The transit server could find the corresponding first client 820 according to the transit server. During encryption, specific characters are added. The specific characters would be characters mutually agreed by the first client 820 and the second client 840, such as "#%", for indicating a type of the encrypted information and its way of open. In the present embodiment, the specific characters are URI (Uniform Resource Identifier) in plaintext. The specific characters are at the head of the encrypted information. The URI could be HTTP://PWData/, wherein HTTP is Hyper Text Transfer Protocol.

The second client 840 is further used for obtaining the fourth QR code, and decoding the fourth QR code to obtain the website address; determining whether account and password corresponding to the website address are stored on the second client 840; and encrypting the website address, account and password if stored; and sending the session identifier and the encrypted website address, account and password to the transit server.

Specifically, the second client 840 receives the fourth QR code through scanning the fourth QR code displayed on the first client 820, or through wireless or wire transmission from the first client 820. The second client 840 finds in its local storage for determining whether corresponding account and password are stored thereon. If there is stored the account and password corresponding to the website address, the second client encrypts the website address, account and password, and packages the session identifier and the encrypted website address, account and password before sending to the transit server.

The receiving module 825 is used for receiving the encrypted website address, account and password from the transit server.

Besides, the receiving module 825 is further used for receiving from the transit server a notification indicative that the second client 840 does not have the website account and password if it is determined that the second client 840 does not have the website account and password corresponding to the website address stored thereon.

The decryption module 827 is used for decrypting to obtain the website account and password.

The notification module 829 is used for notifying the transit server to delete the encrypted website address, account and password after the first client 820 has obtained the website account and password.

Specifically, after the first client 820 has obtained the website address and corresponding account and password, the transit server would immediately delete the encrypted website address and account and password. The stored website address, account and password would be avoided to be unintentionally leaked. In the present embodiment, the second client has got QR code scanning function.

According to an embodiment, a system for roaming website account and password, wherein the system includes a first client 820, the first client 820 includes:

a generation module 826 for obtaining website address, and applying to a transit server for assigning a session identifier; encrypting the website address and the assigned session identifier to generate encrypted information, adding predetermined specific characters into the encrypted information to generate a fourth QR code according to the encrypted information;

a receiving module 825 for receiving the encrypted website address, account and password from the transit server;

a decryption module 827 for decrypting to obtain the website account and password;

a notification module 829 for notifying the transit server to delete the encrypted website address, account and password after the first client 820 has obtained the website account and password.

Wherein, the encrypted website address, account and password are generated through encrypting the website address, account and password on a second client 840 if, the encrypted information received by the second client 840 is decrypted to obtain the website address, corresponding website account and password are stored on the second client 840.

Figure 12:
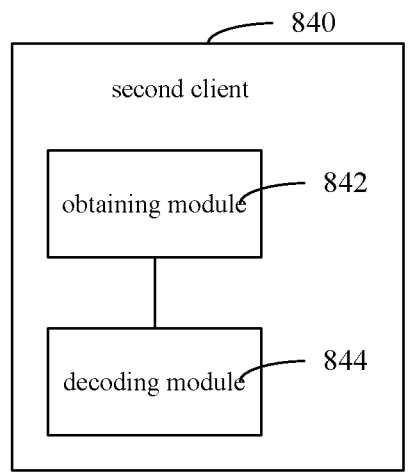
FIG. 12 is a block diagram of a second client according an exemplary embodiment.

Referring to FIG. 12, a system for roaming website account and password includes a second client 840, the second client 840 includes an obtaining module 842 and a decoding module 844. Wherein, The obtaining module 842 is used for obtaining a first QR code generated by a first client 820 after encrypting stored website address, account and password.

The decoding module 844 is used for decoding the first QR code to obtain the website address, account and password, and storing the website address, account and password.

Figure 13:
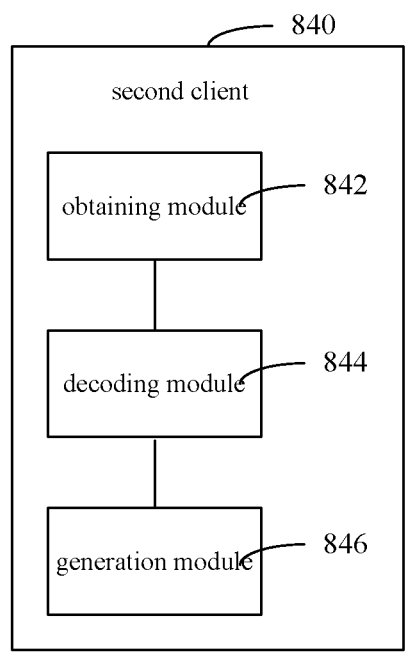
FIG. 13 is a block diagram of a second client according another exemplary embodiment.

Further, referring to FIG. 13, the second client 840 includes a generation module 846 besides the obtaining module 842 and the decoding module 844. Wherein, the obtaining module 842 is further used for obtaining a second QR code generated by a first client after encrypting a website address to be visited. The decoding module 844 is further used for decoding the second QR code to obtain the website address. The generation module 846 is used for obtaining website account and password corresponding to the website address, and encrypting the website address, account and password to generate encrypted information, and generating a third QR code according to the encrypted information.

Figure 14:
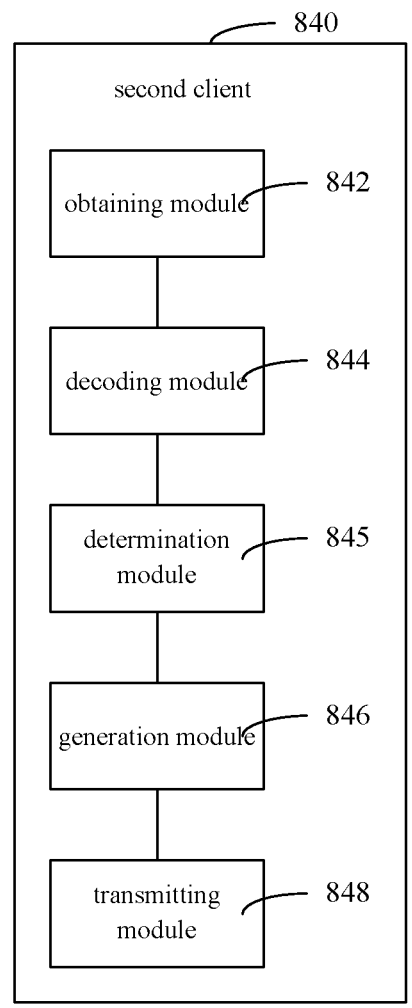
FIG. 14 is a block diagram of a second client according another exemplary embodiment.

Referring to FIG. 14, the second client 840 further includes a determination module 845, a generation module 846, and a transmitting module 848 besides the obtaining module 842 and the decoding module 844. Wherein, The obtaining module 842 is further used for obtaining a fourth QR code generated by a first client after encrypting a website address and an assigned session identifier from a transit server.

The decoding module 844 is further used for decoding the fourth QR code to obtain the website address.

The determining module 845 is used for determining whether account and password corresponding to the website address are stored on the second client.

The generation module 846 is further used for encrypting the website address, account and password.

The transmitting module 848 is used for sending the session identifier and the encrypted website address, account and password to the transit server. Besides, the transmitting module 848 is further used for, if it is determined that the second client does not have the website account and password corresponding to the website address stored thereon, sending to the first client through the transit server a notification indicative that the second client does not have the website account and password.

A system for roaming website account and password includes a second client, the second client includes:

an obtaining module 842 for obtaining a fourth QR code generated by a first client after encrypting a website address and an assigned session identifier from a transit server.

a decoding module 844 for decoding the fourth QR code to obtain the website address.

a determining module 845 for determining whether account and password corresponding to the website address are stored on the second client.

a generation module 846 for encrypting the website address, account and password.

a transmitting module 848 for sending the session identifier and the encrypted website address, account and password to the transit server.

Those skilled in the art could be able to understand that the above method, whether as a whole or part thereof, would be implemented through particular hardware under the instruction of computer and/or mobile terminal executable programs; which program is stored in computer readable medium that, the above steps of the methods would be included when the program is executed. The computer readable medium shall include hard disk, optical disk, Read-Only Memory (ROM) or Random Access Memory (RAM), etc.

Figure 15:
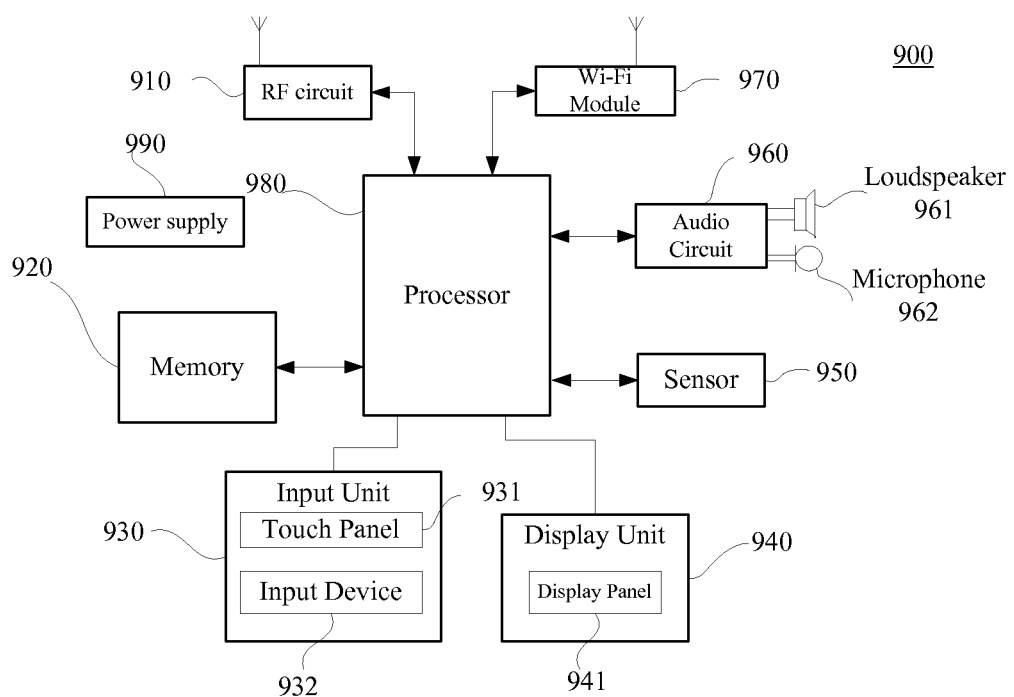
FIG. 15 is a block diagram of a system for roaming website account and password according to another exemplary embodiment.

It is also provided by another embodiment of the present disclosure a system for roaming website account and password, as illustrated in FIG. 15. For simply the description, only the corresponding parts in relation with the present embodiment would be described; other reference would be taken to the description of the method above. The terminal herein could be mobile phone, tablet computer, personal digital assistant (PDA), point of sales (POS), onboard computer, etc. The following description would take mobile phone as an example.

A block diagram of part of a mobile phone in accordance with the terminal of an embodiment of the present disclosure is illustrated in FIG. 15. Referring to FIG. 15, the mobile phone 900 includes: radio frequency (RF) circuit 910, memory 920, input unit 930, display unit 940, sensor 950, audio circuit 960, Wi-Fi module 970, processor 980, and power supply 990. It is appreciated that, the structure as illustrated in FIG. 15 would not limit the mobile phone; the mobile phone would rather have less or more components, or any component combination, or alternative arrangement thereof.

The components of the mobile phone are described with reference to FIG. 15 as below.

The RF circuit 910 is used for transmitting and receiving messages or receiving and sending signals during a call. Specifically, downlink messages are received and processed by the processor 980. Besides, uplink data is transmitted to the base. Usually, the RF circuit 910 includes but not limited to antenna, at least one amplifier, transceiver, coupler, low noise amplifier (LNA), duplexer, etc. Besides, the RF circuit 110 is used for communicating with other devices through wireless communication networks. The wireless communication could be conducted on any of the communication standards or protocols, including but not limited to Global System of Mobile communication (GSM), General Packet Radio Service (GPRS), Code Division Multiple Access (CDMA), Wideband Code Division Multiple Access (WCDMA), Long Term Evolution (LTE), email, Short Message Service (SMS), etc.

The memory 920 is used for storing software programs and modules. The processor operates the software programs and modules that are stored in the memory 920 to provide multiple functionality applications and data processes of the mobile phone. The memory 920 could include a program segment and a data segment, wherein the program segment is used for storing operating system, application program required for at least one functionality (such as audio play, video play, etc.); the data segment is used for storing data that are required and generated during the operation of the mobile phone (for example audio data, contact list, etc.) Besides, the memory 920 could include high speed random access memory, or non-volatile memory, such as at least one disk storage device, flash memory device, or other non-volatile solid state memory device.

The input unit 930 is used for receiving inputted number or character information, and correspondingly generating signal input that relates to the user configuration and functional control of the mobile phone. Specifically, the input unit 930 can include touch panel 931 or other input device 932. The touch panel 931 could also be a touch screen, used for collecting users' touch operations on and around (for example users operate on or around the touch panel 931 through fingers, touch pens, or other appropriate objects or accessories), and for driving corresponding connected devices according to the preset programs. Optionally, the touch panel 931 could include touch detect device and touch controller. The touch detect device is used for detecting the touched position, and detecting the touch signal brought up by the touch operation, and transmitting the touch signal to the touch controller. The touch controller receives the touch signal from the touch detect device and transform into touch point coordinates to be transmitted to the processor 980. The touch controller is further used for receiving commands sent from the processor 980 and executing the commands. The touch panel 931 could be of resistive, capacitive, infrared, surface acoustic wave kinds, etc. Besides the touch panel 931, the input unit 930 may include other input devices 932. Specifically, the other input device 932 could include but not limited to one or more of physical keyboard, functional key (such as volume key, power button, etc.), track ball, mouse, or joystick, etc.

The display unit 940 is used for displaying messages that the user inputs or messages that are provided to the user, or other menus of the mobile phone. The display unit 940 can include a display panel 941. Optionally, the display panel 941 could be configured through Liquid Crystal Display (LCD), Organic Light-Emitting Diode (OLED), etc. Furthermore, the touch panel 931 could be configured to cover the display panel 941. When the touch panel 931 detects the touch operation on or around and transmitted to the processor 980 for determining a type of the touch operation, the processor 980 would provide corresponding visual output on the display panel 941 according to the determined type of touch operation. Although the touch panel 931 and the display panel 941 are provided as separate components in FIG. 15 for providing input and display functions of the mobile phone, in other alternative embodiment, the touch panel 931 and the display panel 941 could be integrated together to provide the input and output function for the mobile phone.

The mobile phone 900 could include at least one sensor 950, for example, a light sensor, a motion sensor, and other sensors. Specifically, the light sensor would include an environmental light sensor and an approaching sensor. The environmental light sensor could be used for adjusting a lightness of the display panel 941 according to an environmental luminance. The approaching sensor can switch off the display panel 941 and/or backlight thereof when the mobile phone is approaching ears of the users. As an example of the motion sensor, an accelerometer sensor is able to detect accelerations on each dimension (usually three dimensions), and while kept still would be able to detect the gravity and the direction thereof; thereby it is configured to be provided in applications for recognizing mobile phone postures (for example switch between horizontal and perpendicular, related games, magnetometer position calibration, etc.), or in vibration identification related functions (such as pedometer, knocking) etc. Other sensors like gyroscope, barometer, hygrometer, thermometer, infrared sensor would be configured to the mobile phone, and would not be described here.

The audio circuit 960, a loudspeaker 961, and a microphone 962 are configured to provide an audio interface between the user and the mobile phone. The audio circuit 960 is used for transmitting received electronic signals that are converted from audio data to the loudspeaker 961, thereby the loudspeaker 961 would have the electronic signals transformed into audio signals to be sent out. On the other hand, the microphone 962 converts received audio signals into electronic signals that are subsequently to be received by the audio circuit 960 and have them transformed into audio data. The processor 980 receives and processes the audio data before sending out through the RF circuit 910, for example to another mobile phone. The audio data could also be sent to the memory 920 to be stored for further process.

Wi-Fi is a sort of short distance wireless transmission technology. Through the Wi-Fi module 970, the mobile phone is able to help users to send and receive emails, browse the web, and visit streaming media, etc. The wireless broadband internet access is thereby provided to the user. It is appreciated that although the Wi-Fi module 970 is provided in the embodiment as FIG. 15, it would not constitute an essential part of the mobile phone 900, and would be eliminated according to user's demand while keeping the spiritual scope of the present disclosure.

The processor 980 is the control center of the mobile phone. The processor 980 is connected to each part of the mobile phone through various interfaces and routes. Through operating or executing software programs and/or modules that are stored in the memory 920, and through calling data that is stored in the memory, the processor 980 is able to execute the functionalities of the mobile phone as well as process data, thereby monitors the mobile phone as a whole. Preferably, the processor 980 may include one or more processing units. Preferably, the processor 980 may have application processor and modulation and demodulation processor that are integrated together. Wherein, the application processor is mainly used for processing operating system, user interface, and the applications; while the modulation and demodulation processor mainly processes wireless communications. It would be appreciated that, the modulation and demodulation processor would alternatively not be integrated in the processor 980.

The mobile phone 900 further includes the power supply 990 for providing power for the components (for instance battery). Preferably, the power supply 990 could be logically connected to the processor 980 through a power management system, thereby functions like charging, discharging, and power consumption could be managed through the power management system.

Although not presented, the mobile phone 900 would further include a camera, a Bluetooth module, etc., which are not described here.

According to an embodiment of the present disclosure, the processor 980 of the terminal would be configured to execute a method for roaming website account and password operational on a first client, wherein the method includes:

verifying website accounts and passwords that have been stored;

obtaining the stored website addresses, accounts and passwords according to a success verification;

encrypting the stored website addresses, accounts and passwords for generating encrypted information, and generating a first QR code to be obtained by a second client according to the encrypted information.

Furthermore, verifying website accounts and passwords that have been stored includes:

selecting one website from the stored website accounts and passwords, and displaying the website and the stored website account;

receiving user inputted password, and determining whether the inputted password is consistent with the stored password; passing the verification if the inputted password is consistent.

Furthermore, encrypting the stored website addresses, accounts and passwords for generating encrypted information further includes:

adding specific characters into the stored website addresses, accounts and passwords;

wherein the specific characters are uniform resource identifier in plaintext, and the specific characters are at the head of the encrypted information.

Furthermore, the processor 980 is further configured for executing the method that:

the second client obtaining the first QR code, and decoding the first QR code to obtain the website addresses, accounts and passwords, and storing the website addresses, accounts and passwords.

Furthermore, the processor 980 is configured for executing the method that:

the first client obtaining website address, and encrypting the website address to generate encrypted information, and generating a second QR code according to the encrypted information;

the second client obtaining the second QR code, and decoding the second QR code to obtain the website address, obtaining website account and password corresponding to the website address, and encrypting the website address, account and password to generate encrypted information, and generating a third QR code according to the encrypted information;

the first client obtaining the third QR code, and decoding the third QR code to obtain the website address, account and password.

Furthermore, the processor 980 is configured for executing the method that:

the first client obtaining website address, and applying to a transit server for assigning a session identifier; encrypting the website address and the assigned session identifier to generate encrypted information, and generating a fourth QR code according to the encrypted information;

the second client obtaining the fourth QR code, and decoding the fourth QR code to obtain the website address; determining whether account and password corresponding to the website address are stored on the second client; and encrypting the website address, account and password if stored; and sending the session identifier and the encrypted website address, account and password to the transit server;

the first client receiving the encrypted website address, account and password from the transit server, and decrypting to obtain the website account and password; and notifying the transit server to delete the encrypted website address, account and password.

Furthermore, the processor 980 is configured for executing the method that:

if it is determined that the second client does not have the website account and password corresponding to the website address stored thereon, the first client receiving from the transit server a notification indicative that the second client does not have the website account and password.

The above described embodiments explain only several exemplary embodiments of the present disclosure. It shall be mentioned that for those skilled in the art, alternative embodiments could be made to which the present disclosure pertains without departing from its spirit and scope, wherein the alternative embodiments shall be defined as within the claim of the current disclosure.

What is claimed is:

1. A method comprising:
    obtaining, by a first client, a website address for which the first client does not have a corresponding account and password stored on the first client;
    applying, by the first client, to a server for a session identifier, to thereby obtain, by the first client, the session identifier;
    encrypting, by the first client, the website address and the obtained session identifier, to thereby generate encrypted information;
    converting, by the first client, the encrypted information into a two-dimensional quick response (QR) code;
    determining, by the second client, whether an account and password corresponding to the website address that was encrypted to generate the encrypted information converted into the QR code are stored on the second client;
    if the determining determines that the account and password are stored on the second client,
        encrypting, by the second client, the account and password corresponding to the website address, and the website address,
        sending, by the second client, the session identifier and the website address, account and password encrypted by the second client to the server,
        receiving, by the first client, the encrypted website address, account and password from the server,
        decrypting, by the first client, the received encrypted website address, account and password, to thereby obtain the website account and password, and
        notifying, by the first client, the server to delete the encrypted website address, account and password from the server; and
    if the determining determines that the account and password are not stored on the second client,
        receiving, by the first client, from the server a notification indicative that the second client does not have the website account and password.

2. The method according to claim 1, wherein the encrypting further comprises:
    adding, by the first client, specific characters to the website address;
    wherein the specific characters are uniform resource identifier in plaintext.

3. The method according to claim 1, wherein the method further comprises:
    obtaining, by the second client, the QR code;
    decoding, by the second client, the obtained QR code to thereby obtain the website address by the second client; and
    storing, by the second client, the website address obtained by the second client.

4. A method comprising:
    obtaining, by a second client, a two-dimensional quick response (QR) code, the QR code having been generated by encrypting, by a first client, a website address for which the first client does not have a corresponding account and password stored on the first client and a session identifier obtained from a server by the first client;
decoding, by the second client, the QR code obtained by the second client, to thereby obtain the website address and the session identifier from the QR code by the second client;
determining, by the second client, whether an account and password corresponding to the website address that was obtained by decoding the QR code are stored on the second client;
if the determining determines that the account and password are stored on the second client,
 encrypting, by the second client, the website address that was obtained by decoding the QR code and the account and password corresponding to the website address stored on the second client, and
 sending the session identifier and the website address, account and password that were encrypted by the second client to the server, to be sent by the server to the first client;
if the determining determines that the account and password are not stored on the second client,
 sending to the first client through the server a notification indicative that the second client does not have the website account and password.

5. A system comprising:
a first client; and
a second client, wherein
 the first client includes at least one non-transitory memory storing computer-readable instructions and at least one processor that executes the instructions stored in the at least one non-transitory memory to:
  obtain a website address for which the first client does not have a corresponding account and password stored on the first client,
  apply to a server for a session identifier to thereby obtain the session identifier by the first client,
  encrypt the obtained website address and the obtained session identifier to thereby generate encrypted information, and
  convert the encrypted information into a two-dimensional quick response (QR) code, and
 the second client includes at least one non-transitory memory storing computer-readable instructions, and at least one processor that executes the instructions stored in the at least one non-transitory memory to cause the second client to:
  obtain the QR code,
  decode the QR code to obtain the website address from the QR code,
  determine whether a website account and password corresponding to the website address that was obtained by decoding the QR code are stored on the second client, and
  if the second client determines that the website account and password are stored on the second client,
   encrypt the website account and password corresponding to the website address that was obtained by decoding the QR code, and the website address, and
   send the session identifier and the website account, password and website address encrypted by the second client to the server;
  the instructions stored in the at least one non-transitory memory included in the first client, when executed by the at least one processor included in the first client, further cause the first client to:
   receive the website account, password and website address encrypted by the second client from the server,
   decrypt the received encrypted website account, password and website address to thereby obtain the website account and password,
   notify the server to delete the encrypted website account, password and website address from the server after the first client has obtained the website account and password, and
   if the second client determines that the website account and password are not stored on the second client, receive from the server a notification indicative that the second client does not have the website account and password.

6. The system according to claim 5, wherein the instructions stored in the at least one non-transitory memory included in the first client, when executed by the at least one processor included in the first client, further cause the first client to:
 add specific characters to the website address, wherein the specific characters are uniform resource identifiers in plaintext.

7. A second client that communicates with a first client, the second client comprising:
 at least one non-transitory memory storing computer-readable instructions; and
 at least one processor that executes the instructions stored in the at least one non-transitory memory to provide:
  an obtaining module configured to obtain a two-dimensional quick response (QR) code from the first client and that was generated by encrypting, by the first client, a website address for which the first client does not have a corresponding account and password stored on the first client and a session identifier obtained by the first client from a server,
  a decoding module configured to decode the QR code obtained by the obtaining module to thereby obtain, by the second client, the website address and the session identifier from the QR code,
  a determining module configured to determine whether a website account and password corresponding to the website address that was obtained by decoding the QR code are stored on the second client,
  a generation module configured to, when the determining module determines that the website account and the password are stored on the second client, encrypt the website address that was obtained by decoding the QR code, and the website account and password corresponding to the website address stored on the second client, and
  a transmitting module configured to
   send the session identifier and the website address obtained by decoding the QR code, and the website account and password corresponding to the website address stored on the second client that were encrypted by the generation module, to the server,
   if the determining module determines that the website account and password are not stored, send to the first client through the server a notification indicative that the second client does not have the website account and password.

* * * * *

UNITED STATES PATENT AND TRADEMARK OFFICE
CERTIFICATE OF CORRECTION

PATENT NO. : 9,525,667 B2  
APPLICATION NO. : 14/266081  
DATED : December 20, 2016  
INVENTOR(S) : Wanxin Wang Page 1 of 1

It is certified that error appears in the above-identified patent and that said Letters Patent is hereby corrected as shown below:

In the Claims

Column 19, Line 33, Claim 5:
Delete "instructions" and insert -- instructions, --, therefor.

Signed and Sealed this
Fourth Day of April, 2017

Michelle K. Lee
*Director of the United States Patent and Trademark Office*